(12) United States Patent
Sun et al.

(10) Patent No.: US 12,282,792 B2
(45) Date of Patent: Apr. 22, 2025

(54) FILE COPY AND PASTE BETWEEN LOCAL AND REMOTE SYSTEM IN VIRTUAL DESKTOPS VIA CLIPBOARD REDIRECTION

(71) Applicant: Omnissa, LLC, Mountain View, CA (US)

(72) Inventors: Qi Sun, Beijing (CN); Feng Yan, Beijing (CN); Li Huang, Beijing (CN); Bo Liu, Beijing (CN); Kun Shi, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 571 days.

(21) Appl. No.: 17/679,477

(22) Filed: Feb. 24, 2022

(65) Prior Publication Data

US 2023/0251884 A1 Aug. 10, 2023

(30) Foreign Application Priority Data

Jan. 3, 2022 (WO) ................ PCT/CN2022/070009

(51) Int. Cl.
*G06F 9/455* (2018.01)
*G06F 3/0486* (2013.01)

(52) U.S. Cl.
CPC ........ *G06F 9/45558* (2013.01); *G06F 3/0486* (2013.01); *G06F 2009/45595* (2013.01)

(58) Field of Classification Search
None
See application file for complete search history.

(56) References Cited

U.S. PATENT DOCUMENTS

| 9,323,562 B2* | 4/2016 | Shah | G06F 9/452 |
| 10,404,797 B2* | 9/2019 | Goli | H04L 67/1095 |
| 2020/0210214 A1* | 7/2020 | Ma | G06F 9/451 |

* cited by examiner

*Primary Examiner* — Eric C Wai
(74) *Attorney, Agent, or Firm* — Kim & Stewart LLP

(57) ABSTRACT

System and method are described for copying and pasting files and folders between a client and a virtual desktop via clipboard redirection. A virtual desktop session can be established by the client on the virtual desktop. The user can copy a file or folder to the virtual desktop clipboard and a path corresponding to the file or folder can be stored in the virtual desktop clipboard in a path list. When the user ungrabs the agent or switches focus out of the virtual desktop to the client, the path list can be transferred to the client device and set into the client clipboard. Subsequently, a request can be received in the client device to paste the copied file or folder to a target location in the client device. In response to the request, the client device can retrieve the contents of the copied file or folder from the agent and the contents can be placed in the target location to complete the paste operation.

20 Claims, 6 Drawing Sheets

FILE COPY AND PASTE BETWEEN LOCAL AND REMOTE SYSTEM IN VIRTUAL DESKTOPS VIA CLIPBOARD REDIRECTION

CLAIM OF PRIORITY

This application is based upon and claims the benefit of priority from International Patent Application No. PCT/CN2022/070009, filed on Jan. 3, 2022, which is incorporated by reference herein in its entirety.

TECHNICAL FIELD

The present disclosure generally relates to virtual desktops and more specifically to techniques for copying and pasting files and folders between the local and the remote system via clipboard redirection.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), VMware Blast Extreme, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

While a virtual desktop offers many advantages over traditional, local systems, various limitations and challenges exist due to the remote distribution of the computing environment. For example, a user who is accessing a virtual desktop on their client device may desire to copy and paste data between the local system and the remote desktop. For example, the user may wish to copy data from the local client device and paste it into the virtual desktop. However, the operation cannot be performed using the standard copy/paste mechanism of the operating system because the client device and the virtual desktop are separate systems that have their own clipboards and are located remotely from each other across the network. To address this problem, some solutions have implemented clipboard redirection features that allow exchange of certain types of data held in the clipboard between the local and remote system. However, those solutions are typically limited to transferring data that could be placed in the clipboard in its entirety, such as text, etc., while copying and pasting of files and folders (which only copies the file/folder path into the clipboard without its content) is either not supported or implemented in an inefficient manner.

What is needed is a more efficient way for copying and pasting data between the local and the remote system in virtual desktops via clipboard redirection.

DETAILED DESCRIPTION

Figure 1:
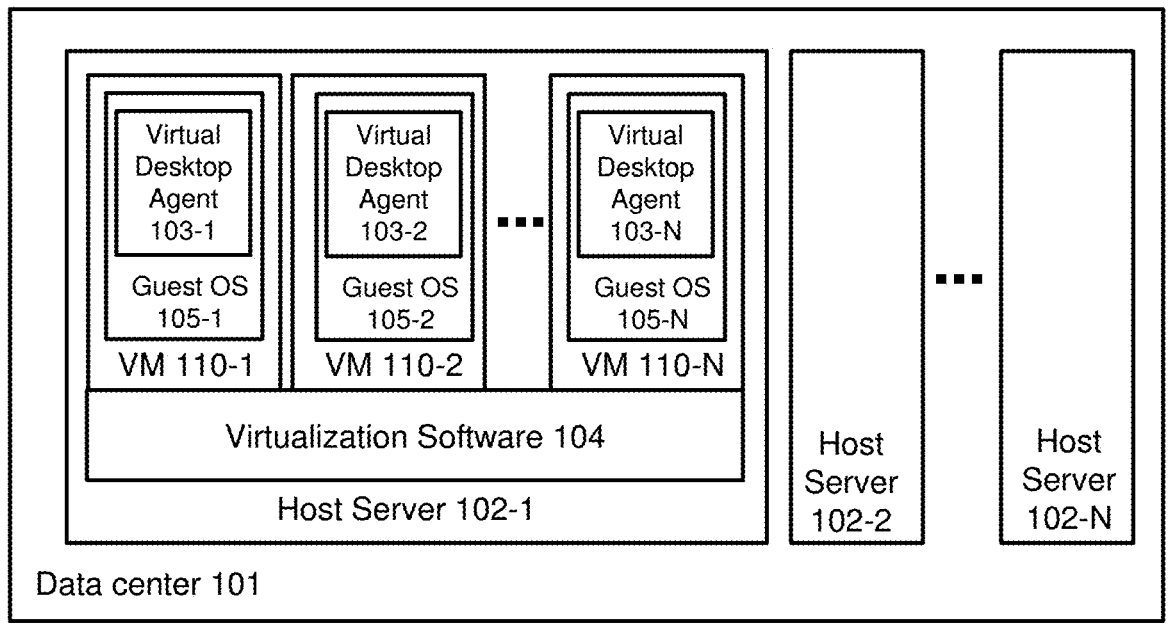
FIG. 1 illustrates an example of a virtual desktop environment, in accordance with various embodiments.
Figure 1:
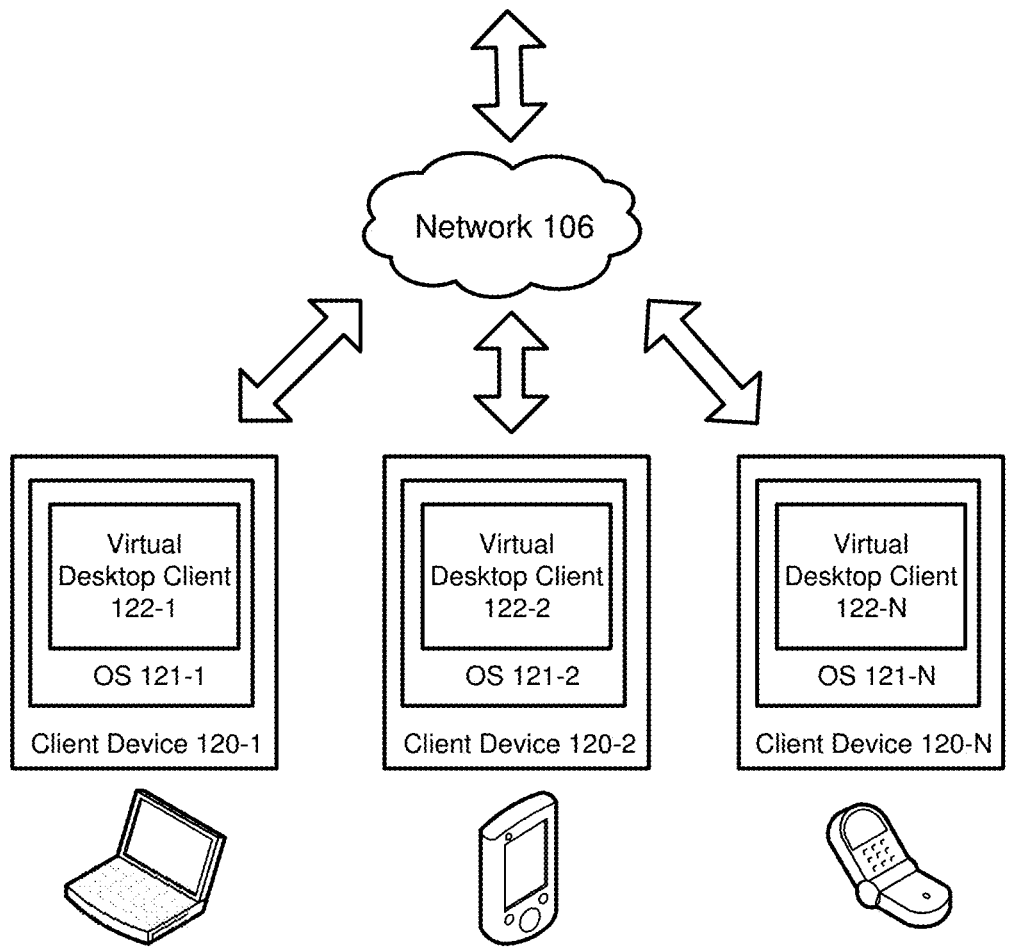

Systems and methods in accordance with various embodiments of the present disclosure overcome at least some of the above-mentioned shortcomings and deficiencies by providing more efficient ways for copying and pasting data between the local and the remote system in virtual desktops via clipboard redirection. In particular, embodiments described herein leverage a mechanism where, when a file or folder is copied by a user to a clipboard in either the remote or the local system, the corresponding file path is set to the clipboard in the other system and content is conveyed over the network when a paste operation is detected in the other system.

The process can begin by establishing a virtual desktop session between a virtual desktop client operating on a client computing device and a virtual desktop agent operating in a virtual desktop on a host server. For example, this can be performed by a user launching a client on their user device and connecting to the first virtual desktop using the client. During the operation of the virtual desktop, a request can be received in the virtual desktop to copy data such as a file or a folder into a clipboard in the virtual desktop, e.g., into the operating system clipboard. For example, the user may make an input such as pressing "Ctrl+C" or selecting "copy" in a menu in an application running in the virtual desktop to copy the file or folder. In response to the user request, a path corresponding to the file or folder can be stored in the virtual desktop clipboard in a path list.

In various embodiments, a clipboard server can execute in the virtual desktop agent, which can correspond with a clipboard client executing in the client, for managing clipboard redirection and the exchange of clipboard data between the client and the virtual desktop. The clipboard server can retrieve the path list from the virtual desktop clipboard and convey it to the clipboard client on the client device to inform the client of the contents of the virtual desktop clipboard. For example, the path list can be conveyed once the user "ungrabs" the agent, meaning that the user switches from the virtual desktop being the active window to another application being the active window (e.g., brings another window to the foreground).

Subsequently, a request can be received in the client device to paste the copied file or folder to a target location in the client device, such as in an application. For example, the user may make an input such as pressing "Ctrl+V" or selecting "paste" in a menu in an application running in the client device to paste the file or folder in the corresponding target location. In response to the request, the clipboard client running on the client device can retrieve the contents of the copied file or folder from the agent and the contents can be placed in the target location to complete the paste operation. In various embodiments, a fast data transfer method such as client drive redirection (CDR) can be utilized for conveying the data to improve user experience.

Hence, with this approach files or folders can be copied from the virtual desktop to the client seamlessly in a way that is similar from the user perspective to copying files/folders between locations on the same computing system or device, even though the copy/paste operation is in fact carried out between the separate client and virtual desktop systems over the network. Further, contents of the copied file or folder can remain on the agent until the user requests to paste the file or folder in the client, which avoids unnecessary transfer of the file/folder data between the client and the virtual desktop until the user requests to paste it.

In a similar way, files or folders can be copied in the other direction, from the client to the agent. In this case, the path list for copied files/folders can be passed from the clipboard client on the client to the clipboard agent in the virtual desktop (e.g., the path list can be passed when the user grabs the agent, such as by clicking in the virtual desktop window) and the corresponding content can be retrieved when the user requests to paste the file/folder in the virtual desktop.

While this disclosure primarily discusses "copy" operations, a "cut" operation is essentially a copy operation followed by a deletion of the copied data. Accordingly, it should be understood that a "cut" operation includes a "copy" operation and the embodiments described herein with reference to "copy" operations apply equally to "cut" operations, as applicable.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.), or the like.

When a client device is accessing a remote desktop using a remote desktop protocol (e.g., RDP, PCoIP, Blast, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user can view the GUI of the remote desktop and interact with it as if the desktop was running on the local client device, even though the desktop is actually executing remotely.

In some cases, instead of providing a user with access to a full desktop session, i.e., where the user gets to see and interact with substantially the entire remote computing environment (e.g., the entire operating system, all applications, settings, etc., of the remote virtual machine), the user can be given access to a limited portion of the desktop or to a certain application or applications on the desktop, so that the user is able to see and interact with the limited portion or certain application(s) and not with other parts of the virtual desktop, which can be hidden from the user. This approach is preferable, for example, when an enterprise wishes to deliver access to a particular application to users, without giving access to the remainder of the computing environment where the application runs. This type of session may be referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device. It should be understood that the term "virtual desktop", as used herein, can apply to cases where access is provided to the substantially entire desktop as well as to cases where access is limited to certain portions of the remote computing environment, such as in the case of virtual applications.

Generally, the clipboard is short-term storage that the operating system (OS) of a computing device provides for transferring data within and between applications on the computing device through copy and paste operations. In the virtual desktop setting, the client device OS provides a clipboard that can be used by the user for copy/paste operations on the client device and the virtual desktop OS provides a clipboard for copy/paste operations on the virtual desktop. Hence, because copy/paste on the client device is performed using the client device clipboard and copy/paste on the virtual desktop is performed using another, separate clipboard, a "clipboard redirection" mechanism needs to be provided to share data between the clipboards to allow the user to copy data on the client and paste it into the virtual desktop, or to copy data on the virtual desktop and paste it on the client.

Hence, clipboard redirection is a feature that transfers data between the local client and the remote system by redirecting clipboard functionality. The feature improves the user experience by enabling users to conveniently share data between the local and remote system. For example, with clipboard redirection, the user can trigger copy-paste between the client and the agent by simply entering "Ctrl+C" in one side and "Ctrl+V" in the other side, just like they would when copying and pasting data within a local device.

With some previous technologies, such as the VMware Horizon virtual desktop products, available from VMware, Inc., clipboard redirection between the client and the agent was implemented in a limited scope for text, image, and other formats; however, file and folder copy/paste was not available because file and folder copy/paste requires a different mechanism than other formats. For example, when a user copies data (e.g., entering "Ctrl+C" to copy) in various formats other than files and folders, the data in its format is placed into the system clipboard, so the application in which the paste occurs (target application) can fetch the entire copied data from the system clipboard after the user requests to paste it (e.g., entering "Ctrl+V").

When a file or folder is copied in an OS, however, the entire content of the file/folder is not placed in the clipboard; instead, only the file/folder path is placed into the clipboard. When pasting, the target application (e.g., Windows File Explorer application in the Windows OS, available from Microsoft Corp.) first retrieves the file path from clipboard, and then fetches the file data through OS file system. This process can be implemented in local file copy-paste between applications in one machine because the file/folder to be copied always exists in that machine. However, the same process cannot be implemented for copy-paste between a local and a remote machine, such as in a virtual desktop environment.

Take copying a remote file from a virtual desktop to the local client machine, for instance. The file/folder to be copied is located in the remote machine; hence, when the user selects to copy the file/folder, the path of the file/folder is placed in the remote clipboard and the content remains on the remote system. To enable pasting the copied content from the local device clipboard, not only would the file path need to be transferred and placed in the local clipboard, but the file data would also need to be transferred to the local device. The various embodiments described herein provide ways for overcoming these issues to enable file and folder copy-paste between local and remote system via clipboard redirection.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
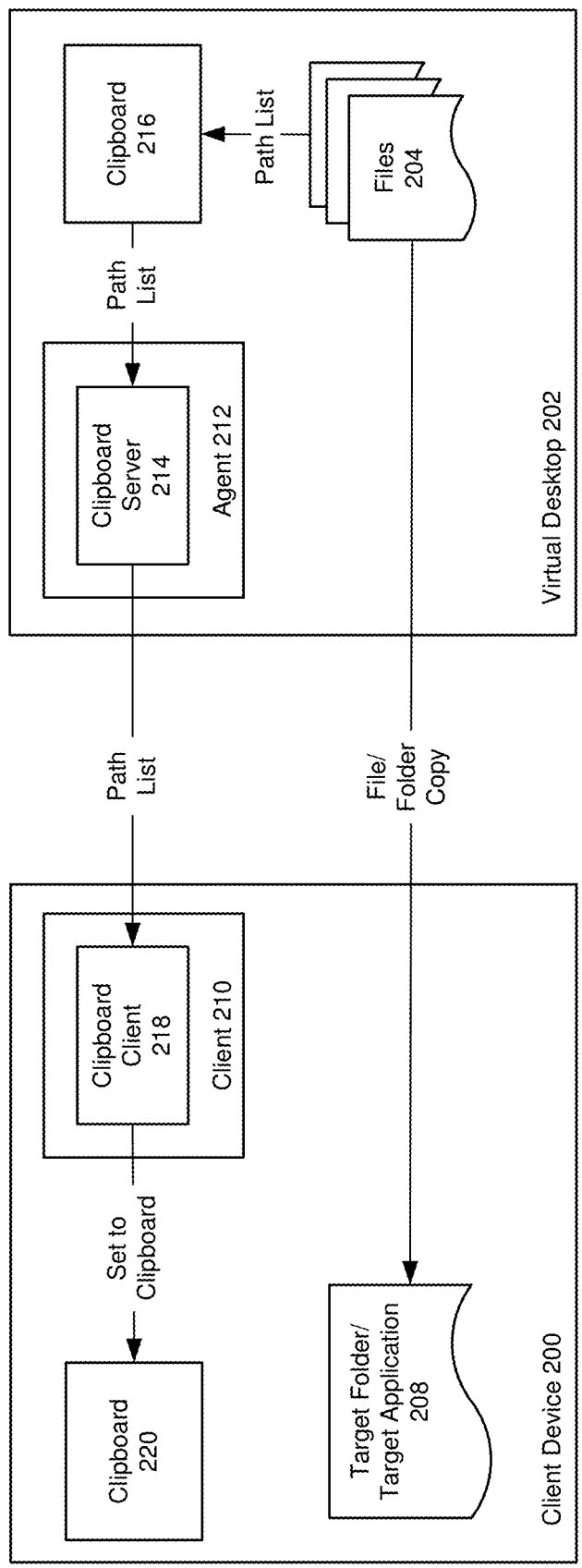
FIG. 2 illustrates an example architecture of a system for clipboard redirection where a file copied from a virtual desktop is pasted into the local device, in accordance with various embodiments.

FIG. 2 illustrates an example architecture of a system for clipboard redirection where a file copied from a virtual desktop is pasted into the local device, in accordance with various embodiments. As illustrated in the example of FIG. 2, a client 210, which may be any kind of virtual desktop client, can operate on a client device 200. A user of the client device 200 can use the client 210 to connect to a virtual desktop agent 212, running in a remote desktop 202, which can be a virtual desktop or a published desktop running on a remote server. Examples of virtual desktop clients and remote desktop products are VMware Horizon desktop and application virtualization products available from VMware, Inc.

After logging into the virtual desktop 202, the user can switch between working in the virtual desktop 202 and the client 200 (e.g., in applications running in the client 200). For example, the user can interact with the virtual desktop 202 via a window presented by the client 210, which can display the desktop 202 GUI and user inputs into the desktop 202 can be conveyed to the desktop 202 (e.g., via the client 210-agent 212 connection) when the client 200 window is active. While the virtual desktop 202 is connected, the user can also work on other applications running in the client device 200. For example, when the user clicks on the window of another application opened in the client device 200, the focus can switch to that application and the user can interact with the application instead of the virtual desktop 202 while the virtual desktop 202 session remains connected.

During the virtual desktop session, the user may wish to copy and paste data between the virtual desktop 202 and the client 200. For example, the user may want to copy data in the virtual desktop 202 (e.g., from a folder or an application in the desktop 202) and paste it into the client 200 (e.g., into a folder or an application in the client 200). Similarly, the user may wish to copy data in the client 200 (e.g., from a folder or an application in the client 200) and paste it into the virtual desktop 202 (e.g., into a folder or an application in the desktop 202). In this example, the case of copying data from the virtual desktop 202 to the client 200 is illustrated, although the mechanism can be applied in reverse for copying/pasting in the other direction.

In various embodiments, the user may produce an input in the virtual desktop 202 to copy a folder or a file 204 that may be located in the virtual desktop 202 file system. For example, the user may use a keyboard shortcut such as "Ctrl+C" (or "Ctrl+X" to cut) when selecting a file/folder or choose a menu option to copy (or cut) the file or folder. After the request to copy the file/folder is received in the desktop 202 (e.g., by the desktop 202 OS), the path to the file/folder can be passed to a clipboard 216 in the desktop 202 as a path list (e.g., this can be a clipboard provided by the desktop 202 OS). In various embodiments, these steps can be performed by the standard functionality of the virtual desktop 202 operating system that allows the user to copy/paste files and folders in the virtual desktop 202.

After copying the file/folder 204 in the virtual desktop 202, the user may produce an input requesting to paste the file/folder 204 in the client device 200. For example, the user may produce an input to paste the file/folder 204 into a target location, such as a target folder or application 208 in the client device 200. The user may do this by switching focus to an application (e.g., in File Explorer in the Windows system) in the client device 200 and pressing a keyboard shortcut such as "Ctrl+V" or selecting paste from a menu, for instance.

In various embodiments, after the request to paste the file/folder 204 is received in the client device 200, the client device can request the file/folder 204 from the desktop 202 and the requested file/folder 204 can be conveyed in response to the request and saved in the target location 208 to perform the paste operation.

As mentioned above, previous virtual desktop products such as the VMware Horizon virtual desktop infrastructure implemented clipboard redirection for certain types of data other than files and folders. In those products, clipboard data was transferred to the peer (i.e., from the local system to the virtual desktop and vice versa) when grab or ungrab events happened on the virtual desktop (e.g., when the user switched between the virtual desktop window being active and inactive), even though the user might not trigger a paste command. Hence, data copied to the clipboard was transferred back and forth between the client and the agent over the network repeatedly whenever the user grabbed or ungrabbed the agent whether or not the user requested to paste the data, which may be wasteful and negatively impact performance.

To avoid performance degradation, past systems added size restrictions for other formats (other than files/folders, which were not supported) in clipboard redirection and by default the user could only copy-paste data no more than the prescribed size (e.g., 1 megabyte). Compared to the other formats to be copied (such as text or images), file/folder data tends to be large and it is unreasonable to apply such size control. However, if entire files or folders were allowed to be placed in the clipboard when the user copies the files/folders and then transferred between the client and agent every time the user switches between the client and the agent, as done with other non-file/folder formats in previous technologies, then the impact on performance could be disastrous as large volumes of file/folder data would be transferred back and forth over the network every time the user makes the switch irrespective of whether the user requests to paste the data. As illustrated in the example of FIG. 2, in various embodiments, to overcome this issue, when files/folders are copied on one side (client or virtual desktop), the data of the copied files/folder can be transferred to the other side (virtual desktop or client) when a request is made to paste the copied files/folders on the other side, thereby avoiding the unnecessary transfer of data between the client 200 and the virtual desktop 202 before a request to paste the data is received or detected.

In various embodiments, a clipboard server 214 can be a component operating in the agent 212 that corresponds with a clipboard client 218 in the client 210 to manage and implement clipboard redirection and exchange of clipboard data. The clipboard server 214 can be a user process on the agent side. The clipboard server 214 and clipboard client 218 can create a data channel to transfer various control messages for implementing clipboard redirection. In an embodiment, the actual file data transfer (once paste is requested) can be conveyed over the same data channel as the control messages; however, in a preferred embodiment, the data transfer can take place over a separate fast channel such as client drive redirection (CDR). The CDR channel can provide data compression and encryption which can result in more secure and faster data transfer.

In various embodiments, after the file/folder 204 is copied to the clipboard 216, the clipboard server 214 can retrieve the path list (e.g., which can contain the paths to the copied file/folder) and the clipboard server 214 can forward the path list to the clipboard client 218. The path list can be conveyed to the clipboard client 218 at different times during execution. In an embodiment, the path list can be conveyed after the user ungrabs the virtual desktop agent 212 (e.g., after the user switches focus away from or makes the virtual desktop 202 window on the client device 200 inactive by bringing focus into another window). Namely, because the user may copy multiple items while working in the virtual desktop 202, it may be wasteful to inform the client 210 of the copy operations taking place on the desktop 202 until the user switches out of working in the virtual desktop 202. Thus, when the agent 212 (or clipboard server 214) detects or is notified that the user ungrabbed the agent 212, the agent 212 (or clipboard server 214) can retrieve the clipboard 216 contents, the path list (containing copied file/folder 204 paths) and send a message containing the path list to the clipboard client 218.

As used herein, the terms "grab" and "ungrab" in reference to the agent, e.g., agent 212 can refer to the virtual desktop 202 being made active and inactive, respectively. In various embodiments, the user can grab the agent by moving the mouse into the virtual desktop client window in the client device 200 (and clicking in the client window); and the user can ungrab the agent by moving the mouse outside of the virtual desktop client window in the client device 200 (and clicking outside the window or in another application window on the client device. For example, when the agent is grabbed, the system focus can be on the virtual desktop (e.g., the virtual desktop window can become the active window) and when the agent is ungrabbed, the system focus can be elsewhere than the virtual desktop (e.g., the virtual desktop window can become inactive). For example, when the user desires to work in the virtual desktop, they can click in the virtual desktop window on the client device to grab the agent 212, making the virtual desktop window active; and when the user wants to work on applications running in the client device 200, the user can click outside of the virtual desktop window on the client device to ungrab the agent 212, making the virtual desktop window inactive. In other embodiments different methods can be used to make a window active, such as hovering the mouse over the window without clicking or using other types of input commands.

After the clipboard client 218 receives the path list (e.g., after the user ungrabs the agent 212), a request (e.g., produced by the user) can be received on the client device 200 to paste to the target folder/application 208. In response to the request, the clipboard client 218 can send a message to the clipboard server 214 requesting the contents of the copied file/folder 204 and the copied file/folder can be conveyed to the client device 200 and stored in the target folder/application 208 in response to the request, thereby completing the paste request.

In various embodiments, a temporary folder can be used to store the copied file/folder data that is transferred from the virtual desktop 202 on the client device 200 and after the transfer is complete, the data request can be resumed and the requesting application can be directed to the temporary folder to retrieve the paste data.

Various approaches can be used to detect when the user makes a paste request in the client device 200 so that the data transfer of the copied file/folder from the virtual desktop 200 can be triggered. For example, the system can monitor user inputs and use filters and other tools to detect and intercept a paste input or request made by the user. However, such approaches can be difficult to implement (e.g., the user may have a variety of methods to request a paste such as keyboard shortcuts, menus, etc. in different applications, and the operating system may not provide a way to monitor or filter paste requests in the system).

However, because a paste request generally results in a query being made to the system clipboard 220 (clipboard provided by the OS of the client device 200), paste requests to the file/folder copied on the virtual desktop 202 can be detected by monitoring accesses or data requests to the clipboard 220. For example, in various embodiments, a data request can be received at the clipboard 220 (e.g., by the file system) and in response the system can hang or suspend the request, retrieve the file/folder 204 data from the virtual desktop 202, and return the transferred data in response to the request.

In various embodiments, when the clipboard client 218 receives the path list from the clipboard server 214, the clipboard client 218 can set the path list into the clipboard 220 such that, when a data request is made to the clipboard 220, the request can be suspended while the file/folder data (corresponding to the path list) is transferred from the virtual desktop 202. After the transfer is complete, the data request can be resumed and the transferred file/folder data can be returned in response to the data request.

Different approaches can be used to set the path list into clipboard 220. For example, when the clipboard client 218 receives the path list from the clipboard server 214, the clipboard client 218 can generate a data object containing the path list and place the data object in the clipboard 220. Consequently, when the file system accesses the clipboard 220 in response to a paste request, it can query the data object and, in response, the data object can suspend the data request and send a message to the virtual desktop 202 (e.g., to the clipboard server 214) requesting the file/folder 204. The file/folder 204 contents can then be conveyed to the client device 200 and saved in the target folder/application 208. This approach can be utilized in the Windows operating system that supports such data objects. For a Windows client/agent, an OLE object IDataObject can be used, which is supported by the Windows OS. The data object can store the file path (e.g, from the path list supplied from the clipboard server 214) and be set into clipboard 220 by the clipboard client 218. The IDataObject can be notified when the user triggers the paste (e.g., when the file system queries the IDataObject in the clipboard 220) and it can hang the data request from the requesting application, trigger a transfer of the file/folder 204 data from the virtual desktop 202, and respond to the request only after the file/folder 204 transfer is complete. This approach will be described in greater detail below.

A different approach can be used in systems that don't support a data object like Windows, such as Linux and Mac OS (available from Apple Inc.) platforms. For example, in a Linux or Mac OS platform, a "vmblock" component can be utilized. The vmblock can be a user mode file system based on Linux file system driver in user space (FUSE). FUSE is a software interface for Unix and Unix-like computer operating systems that lets non-privileged users create their own file systems without editing kernel code. FUSE is available for Linux, FreeBSD, OpenBSD, NetBSD (as puffs), OpenSolaris, Minix 3, Android, and macOS.

Taking file copy-paste from agent to Linux client as an example, the file/folder path can be passed from the agent to the client, and the client can create a temporary folder and share it to the agent. The client can then add the temporary folder to vmblock and place it into the clipboard as the copy source. After the user triggers paste, the target application can try to read file data from the temporary folder via the file system. The vmblock can then block the file read and trigger file copy from the agent to the temporary folder in the client. After file copy is done, the vmblock can unblock the file read and redirect all the file operations to the temp folder so that file system can fetch the file data. This approach will also be described in greater detail below.

In further embodiments, other approaches can likewise be utilized for setting the path list into the clipboard 220 such that when a data request to the clipboard 220 is received, the copied file/folder data transfer process is triggered, and the file/folder data is returned in response to the data request. For example, such approaches can use various methods to detect or intercept data requests to the clipboard 220, such as using filters; or otherwise hooking into the clipboard 220 to monitor accesses and data requests.

The same approach as described in the example of FIG. 2 can be utilized for copying and pasting files/folder in the other direction (from the client device 200 to the virtual desktop 202). In this case, the target folder/target application can be located on the virtual desktop and the files/folders can be copied to the clipboard on the client device when the user produces a "copy" input. The clipboard client can then carry out the same roles as carried out by the clipboard server above in the example of desktop-to-client copy and, accordingly, the clipboard server can carry out the same roles as carried out by the clipboard client, above. In this case, for example, the message that was sent from the clipboard server 214 to the clipboard client 218 to provide the path list when the user ungrabs the agent 212 can be sent in the other direction (from the clipboard client 218 to the clipboard server 214) after, or in response to, the user grabbing the virtual desktop 202.

Figure 3:
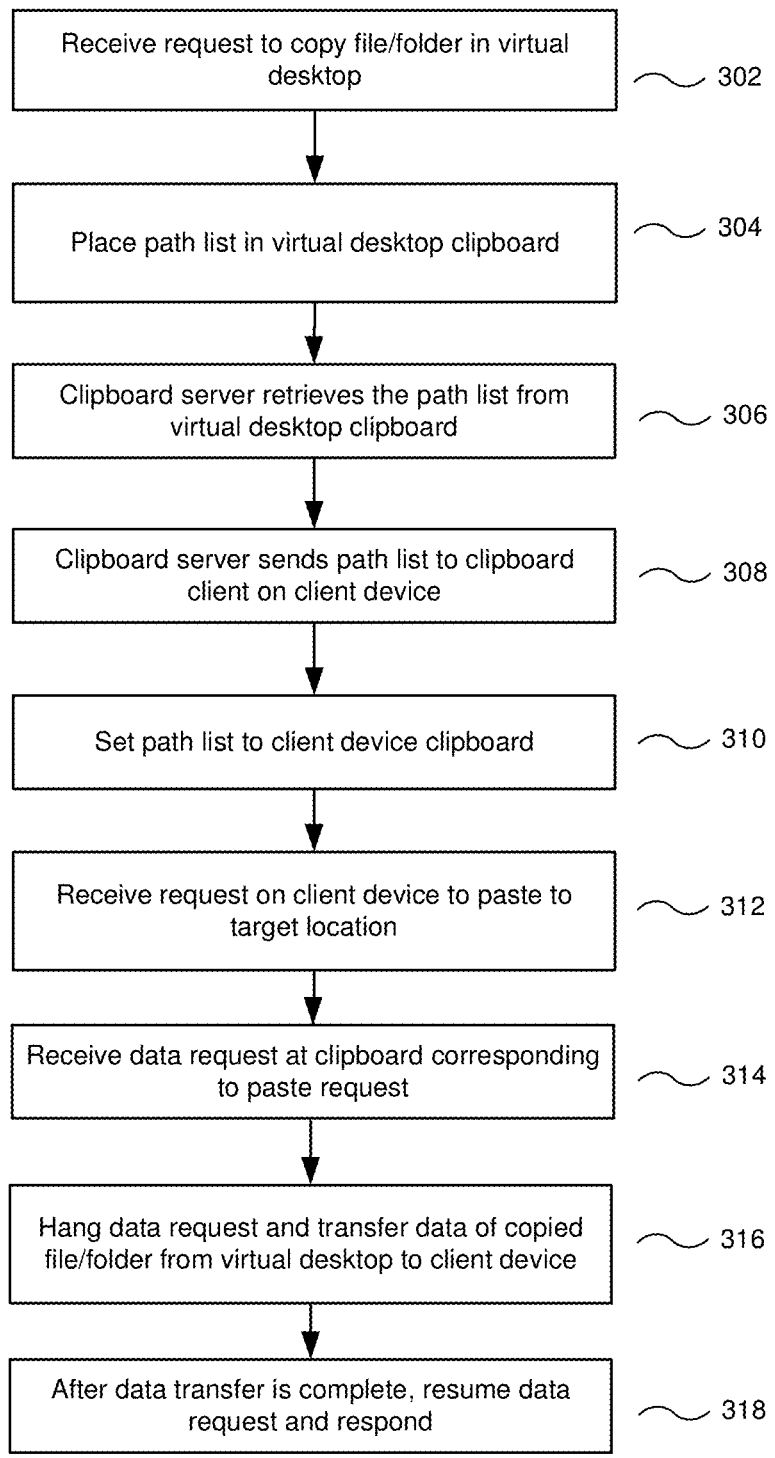
FIG. 3 illustrates an example process flow for clipboard redirection where a file copied from a virtual desktop is pasted into the local device, in accordance with various embodiments.

FIG. 3 illustrates an example process flow for clipboard redirection where a file copied from a virtual desktop is pasted into the local device, in accordance with various embodiments. The process can take place in a system including a client executing on a client device that is connected in a virtual desktop session to an agent running in a virtual desktop, as described above. For example, the session can be established by a user logging into the virtual desktop via a client running on the user's client device. The client can connect to the agent in the desktop to establish the session.

The process can begin in operation 302, where a request is received to copy a file or a folder in the virtual desktop. For example, the user can make an input to copy a file or a folder in the virtual desktop. In response to the request, in operation 304, a file/folder path list can be placed in the virtual desktop clipboard, which can contain the path to the copied file/folder.

In operation 306, a clipboard server executing in the virtual desktop (e.g., in the agent) can retrieve the path list from the virtual desktop clipboard. In various embodiments, operation 306 can be performed after or in response to the user ungrabbing the agent (e.g., making the virtual desktop window inactive or taking system focus away from the virtual desktop on the client device).

In operation 308, the clipboard server can send the path list to the clipboard client on the client device. In operation 310, the path list can be set to the client device clipboard. As discussed above, different methods can be implemented for setting the path list into the clipboard such that a data request to the clipboard for the file/folder triggers a transfer of the file/folder data from the remote desktop that can be returned in response to the data request, such as by using a data object (in a Windows system), a file driver (in a Linux/Mac OS system), etc.

In operation 312, a request can be received on the client device to paste to a target location. For example, the user can make an input in a target application running in the client device requesting to paste the file/folder to the target location. In operation 314, a data request can be received at the client device clipboard corresponding to the paste request. For example, the target application can query the clipboard via the file system for the file/folder data to provide in response to the paste request. In operation 316, the data request can be hung or suspended, and the data of the copied file/folder can be transferred from the virtual desktop to client device (e.g., to the target location or to a temporary folder).

In operation 318, after the data transfer is complete, the data request can be resumed and responded to. For example, if the data was copied to a temporary folder, then the folder can be returned in response to the request. If the data was copied to the target location, then the data request can be responded to as complete.

While the example process flow of FIG. 3 illustrates a copy-paste operation from the virtual desktop to the client, a copy-paste operation in the reverse direction (from the client to the virtual desktop) can be performed using essentially the same process. In that case, the client-side components and the corresponding agent-side components can switch roles. For example, the client-side components described in FIG. 3 can perform the functions performed by the corresponding agent-side components in the example and the agent-side components can perform the functions performed by the corresponding client-side components in the example.

Figure 4:
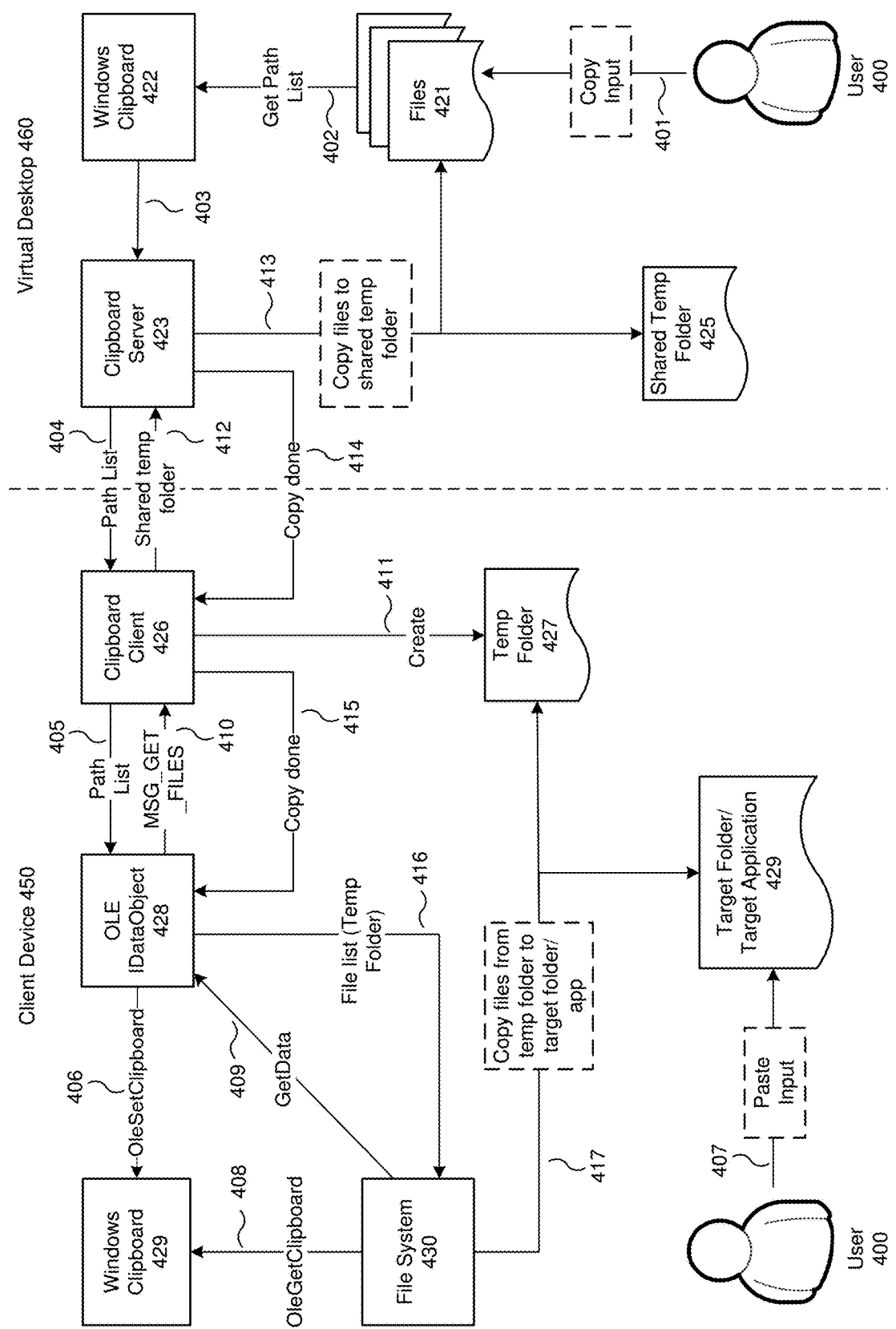
FIG. 4 illustrates an example architecture of a system for clipboard redirection utilizing a data object for setting a path list to the clipboard, in accordance with various embodiments.

FIG. 4 illustrates an example architecture of a system for clipboard redirection utilizing a data object for setting a path list to the clipboard, in accordance with various embodiments. This example is based on the Windows operating system, which supports data objects, but the same principles can be applied in other operating systems supporting data object with the required functionality.

As illustrated in the example of FIG. 4, the system is divided into components on the virtual desktop 460 side where a file/folder can be copied and pasted into a target folder/target application 429 on the client device 450 side. As will be appreciated by those skilled in the art, while this example illustrates the copying of a file in the remote desktop and pasting to the local client device, the same principles illustrated here can be applied to copy-paste in the opposite direction from the client device 450 to the virtual desktop 460.

As illustrated, the user can select a file or folder in the virtual desktop's files 421 and produce a copy request input (arrow 401) corresponding to the selected file/folder in the files 421 to begin the copy-paste process. For example, the user can select the file/folder and utilize a keyboard shortcut such as Ctrl+C, select a "copy" command from a menu, or use any other method for requesting to copy the selected file/folder.

In response to the copy request, a file path list or "path list" corresponding to the copied file/folder can be placed in the system clipboard 422, which in this case can be a Windows clipboard, as illustrated by arrow 402. A clipboard server 423 can retrieve the file path list from the clipboard 422, illustrated by arrow 403. For example, the clipboard server 423 can retrieve the file path list when the user ungrabs the agent (e.g., the clipboard server 423 can detect the ungrab operation and retrieve the path list in response).

In various embodiments, the clipboard server 423 can be a component running in the virtual desktop agent. It can be a user process on the agent side. The clipboard server 423 can correspond with a client-side clipboard client 426 and these components can work together to implement clipboard redirection. The clipboard server 423 and clipboard client 426 can create a data channel to transfer various control messages for implementing clipboard redirection. In an embodiment, the actual file data transfer (once paste is performed) can be conveyed over the same data channel as the control messages; however, in a preferred embodiment, the data transfer can take place over a separate fast channel (e.g., using compression algorithms) such as CDR.

After retrieving the path list, the clipboard server 423 can send it to the clipboard client 426 (arrow 404). The clipboard client 426 can then create a data object 428 and it can set the path list to (or put the path list in) the data object 428 (arrow 405). As illustrated, in the Windows system, the data object can be an OLE data object ("OLE IDataObject"). The clipboard client 426 can set the data object 428 to the client device system clipboard 429, which can be a Windows clipboard (arrow 406). For example, the clipboard client 426 can make an OleSetClipboard call, (arrow 406), to set the IDataObject to the system clipboard. Setting the data object 428 into the clipboard 429 in this context can mean placing the data object 428 into the clipboard 429 such that the client device file system 430 can query the data object in the clipboard 429 when requested.

In various embodiments, the data object can be any kind of component that can be created and placed in the clipboard 429 to perform certain functions when it is queried or accessed in the clipboard (e.g., by the file system 430). As mentioned, the Windows OS supports such data objects. In Windows, a data object, such as COM (Component Object Model) components, can be created and functionality can be added into it for various purposes. This feature can be leveraged in Windows and in other systems that support such data objects to implement the applicable embodiments described herein.

After the data object 428 is set to the clipboard 429, the user 400 can produce a paste request input in the client side (arrow 407) requesting to paste clipboard 429 contents to the target folder/target application 429. For example, the user can select the target folder/target application and utilize a keyboard shortcut such as Ctrl+V, select a "paste" command from a menu, or use any other method for requesting to paste to the target folder/application 429. In response to the paste request, the file system 430 can fetch the data object (IDataObject) from the system clipboard 429 with an OleGetClipboard message or call, as illustrated by arrow 408. For example, when the user 400 requests the paste in a file explorer or a target application, the file explorer or the target application can attempt to retrieve data from the clipboard 429 but when it finds that the data is a file or folder, it can turn to the file system 430 to retrieve the requested file/folder data.

The file system 430 can query the path list in the data object 428 with a GetData message or call (arrow 409). When the data object 428 is queried, it can notify the clipboard client 426 to retrieve the file/folder data from the agent side by sending a message (MSG_GET_FILES) to the clipboard client 426 (arrow 410). The data object 428 can also hang or suspend the data request from the file system 430 while the data is transferred. For example, when the data object is informed (e.g., by the file system 430 GetData message) that data for the file/folder in the path list is requested, it can send this message (arrow 410) to the clipboard client 426.

In response to the request to retrieve the file/folder data, the clipboard client 426 can initiate a process to transfer the data. First, the clipboard client 426 can create a temporary folder 427 on the client side (arrow 411) to facilitate with the data transfer because the file/folder data is still on the agent side. After creating it, the clipboard client 426 can share the temporary folder 427 (e.g., share its path or location) with the agent side (e.g., with the clipboard server 423) (arrow 412). The clipboard server 423 can then copy the file/folder data from the source folder in the files 421 to the shared temporary folder 425 (arrow 413). After the file/folder data is copied, the clipboard server 423 can send a "copy done" message to the clipboard client 426 to notify it that copy to the temporary folder 425 is complete (arrow 414). The clipboard client 426 can then send a "copy done" event to the data object 428 (arrow 415). The data object 428 can then return the temporary folder 427 to the file system 430 in response to its pending data request (arrow 416). For example, data object 428 can resume the hanging data request and inform the file system 430 to retrieve the file/folder data from the temporary folder 427 (e.g., the data object 428 can update the actual path list to informing the file system 430 to retrieve the file/folder data from the temp folder). The file system 430 can then copy the file/folder from the temporary folder 427 to the target folder or target application 429 (arrow 417).

As mentioned previously, unlike Windows, some operating systems don't provide the data object support needed for implementations such as the example of FIG. 4. For example, the Linux and Mac OS platforms don't provide such data object support. In these cases, a different approach can be utilized. For example, a filter driver can be used that detects a paste operation and triggers the data transfer of copied data.

Figure 5:
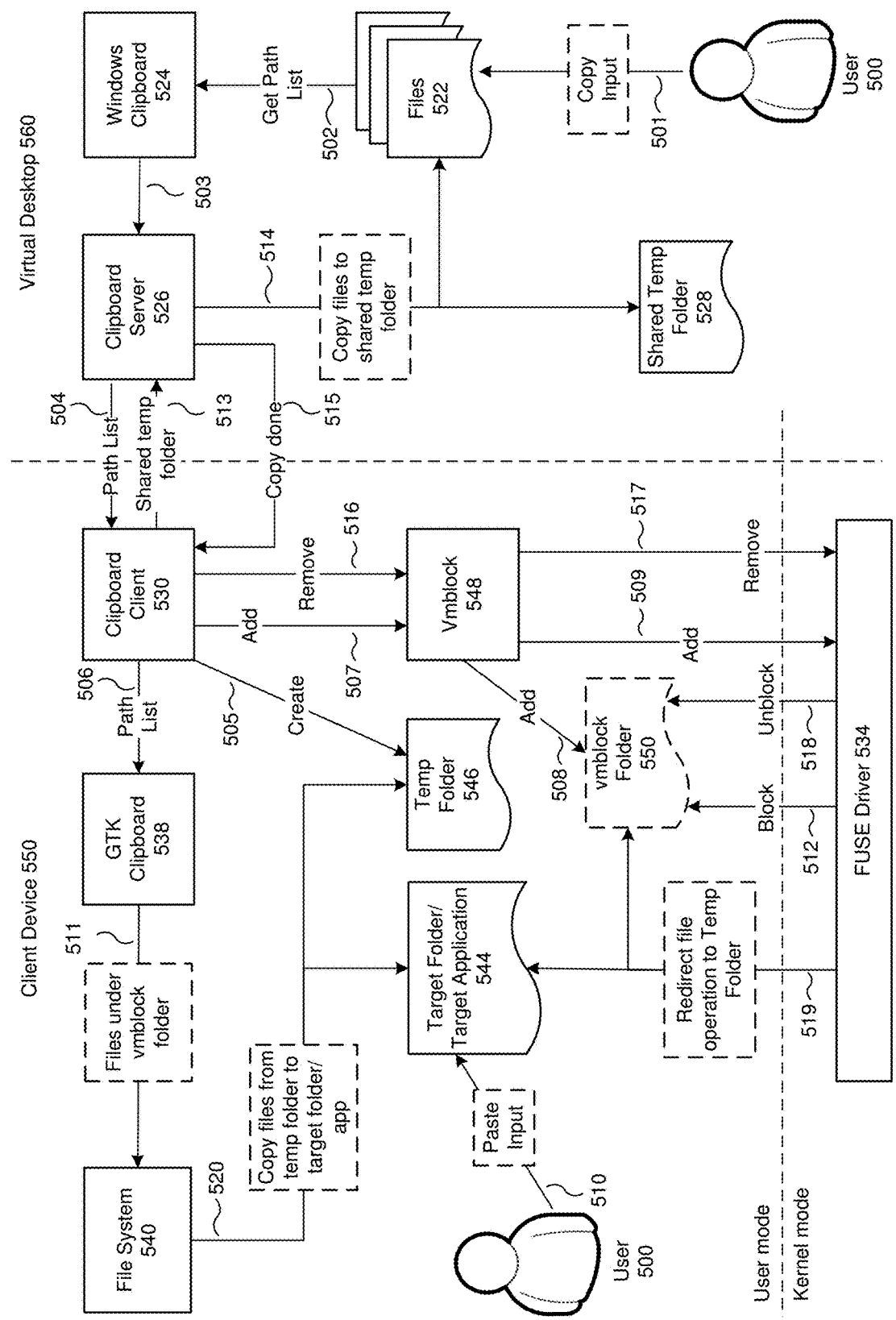
FIG. 5 illustrates an example architecture of a system for clipboard redirection utilizing a file driver for setting a path list to the clipboard, in accordance with various embodiments.

FIG. 5 illustrates an example architecture of a system for clipboard redirection utilizing a file driver for setting a path list to the clipboard, in accordance with various embodiments. In this example, the client can be a Linux or Mac OS based system, while the agent can be a Windows system, for example. As illustrated in the example of FIG. 5, the system is divided into components on the virtual desktop 560 side where a file/folder from files 522 can be copied and pasted into a target folder/target application 544 on the client device 550 side.

To enable file/folder clipboard redirection in such environments, a vmblock 548 component can be utilized. The vmblock 548 can be a user mode file system based on Linux file system driver in user space (FUSE). FUSE is a software interface for Unix and Unix-like computer operating systems that lets non-privileged users create their own file systems without editing kernel code. FUSE is available for Linux, FreeBSD, OpenBSD, NetBSD (as puffs), OpenSolaris, Minix 3, Android, and macOS.

To more concisely describe the process, after file/folder copy is triggered on the virtual desktop 560 side, the file/folder path can be passed from the agent to the client, and the client can create a temporary folder 546 and share it to the agent. The client can then add the temporary folder 546 to the vmblock 548 (so that vmblock 548 can detect accesses to the temporary folder 546) and place it into the clipboard 538 as the copy source. After the user 500 triggers paste, the target application can try to read file data from the temporary folder 546 via the file system 540. The vmblock 548 can then block the file read and trigger file copy from the agent to the temporary folder 546 in the client. After the file copy is done, the vmblock 548 can unblock the file read and redirect all the file operations to the temp folder 546 so that file system 540 can fetch the file data.

In various embodiments, the vmblock 548 can be a file driver that is placed above the system file driver (e.g., a layer can be added above the standard file system driver) to filter or get informed about file operations, such as read/write operations in the file system. Then, when the temporary folder is created and added into the vmblock 548 driver, the vmblock 548 can detect or be notified of any accesses to the temporary folder 546. Then, when a data request is received from the file system in response to a paste command, the vmblock 548 can block or suspend/hang the data request and trigger the corresponding transfer of file/folder data from the agent side to perform the paste operation. The process will be described in more detail below.

To initiate the copy-paste process, the user can select a file or folder in the virtual desktop's files 522 and produce a copy request input (arrow 501) corresponding to the selected file/folder in the files 522 to begin the copy-paste process. For example, the user can select the file/folder and utilize a keyboard shortcut such as Ctrl+C, select a "copy" command from a menu, or use any other method for requesting to copy the selected file/folder.

In response to the copy request, a file path list or "path list" corresponding to the copied file/folder can be placed in the system clipboard 524, which in this case can be a Windows clipboard, as illustrated by arrow 502. A clipboard server 526 can retrieve the file path list from the clipboard 524, illustrated by arrow 503. For example, the clipboard server 526 can retrieve the file path list when the user ungrabs the agent (e.g., the clipboard server 526 can detect the ungrab operation and retrieve the path list in response).

In various embodiments, the clipboard server 526 can be a component running in the virtual desktop agent. It can be a user process on the agent side. The clipboard server 526 can correspond with a client-side clipboard client 530 and these components can work together to implement clipboard redirection. The clipboard server 526 and clipboard client 530 can create a data channel to transfer various control messages for implementing clipboard redirection. In an embodiment, the actual file data transfer (once paste is performed) can be conveyed over the same data channel as the control messages; however, in a preferred embodiment, the data transfer can take place over a separate fast channel (e.g., using compression algorithms) such as CDR.

After retrieving the path list, the clipboard server 526 can send it to the clipboard client 530 (arrow 504). After the clipboard client 530 receives the path list, a temporary folder 546 can be created on the client side (arrow 505) where the to-be-copied file/folder data will be transferred from the agent side if a paste request is made. In the macOS, for example, this step can enable the paste operation. The created temporary folder 546 can then be set to or placed in (e.g., by the clipboard client 530) the system clipboard 538, which can be a GTK clipboard in a Linux system (arrow 506). In a macOS system, the temporary folder 546 can be set to the macOS clipboard. Then, the clipboard client 530 can call the vmblock 548 API to add the path list (arrow 7) and the vmblock 548 can add the input path list to the vmblock folder 550 (arrow 508). Vmblock 548 can add the input path list to the FUSE driver 534, operating in kernel mode (arrow 509).

As shown by arrow 510, the user 500 can produce a paste request input in the client side requesting to paste clipboard 538 contents to the target folder/target application 544. For example, the user can select the target folder/target application and utilize a keyboard shortcut such as Ctrl+V, select a "paste" command from a menu, or use any other method for requesting to paste to the target folder/application 544. In response to the paste request, the file system 540 can access the temp folder in the clipboard 538. For example, when the user 500 requests the paste in a file explorer or a target application, the file explorer or the target application can attempt to retrieve data from the clipboard 538 but when it finds that the data is a file or folder, it can turn to the file system 540 to retrieve the requested file/folder data.

The GTK Clipboard 538 (or the macOS clipboard for macOS) can return the path list under the vmblock folder 550 to the file system 540 (arrow 511). When the file system 540 attempts to read the files under the vmblock folder 550, the FUSE driver 534 can block the READ operation of the files under the vmblock folder 550 (arrow 512).

Then, the clipboard client 530 can share the temp folder 546 to the agent, e.g., via Client Drive Redirection (CDR) feature (arrow 513). The clipboard server 526 can copy the files 522 from the source folder to the shared temp folder 528 (arrow 514). When complete, the clipboard server 526 can send a "copy done" message to the clipboard client 530 (arrow 515). In response, the clipboard client 530 can remove the blocking of the copied path list by calling the vmblock 548 API (arrow 516). In response, vmblock 548 can remove the blocking of the path list from the FUSE driver 534 (arrow 517). The FUSE driver 534 can then unblock the copying path list under the vmblock folder 550 (arrow 518) and the FUSE driver 534 can redirect the file operations from the temp folder 546 to the vmblock folder 550 (arrow 519). Lastly, the file system can copy the file/folder from the temporary folder 546 to the target folder/target application 544 to complete the paste (arrow 520).

As illustrated above, in this approach, the temporary folder 546 is placed into the system clipboard 538 so that when the paste occurs, the target application retrieves the temporary folder 546 from the clipboard 538 and accesses the temporary folder 546 to retrieve file/folder data. However, because the temporary folder 546 was added into the vmblock 548, the vmblock 548 is informed that the paste occurred and can block the file retrieval and inform the clipboard client 530 to perform the data transfer for the paste operation.

Figure 6:
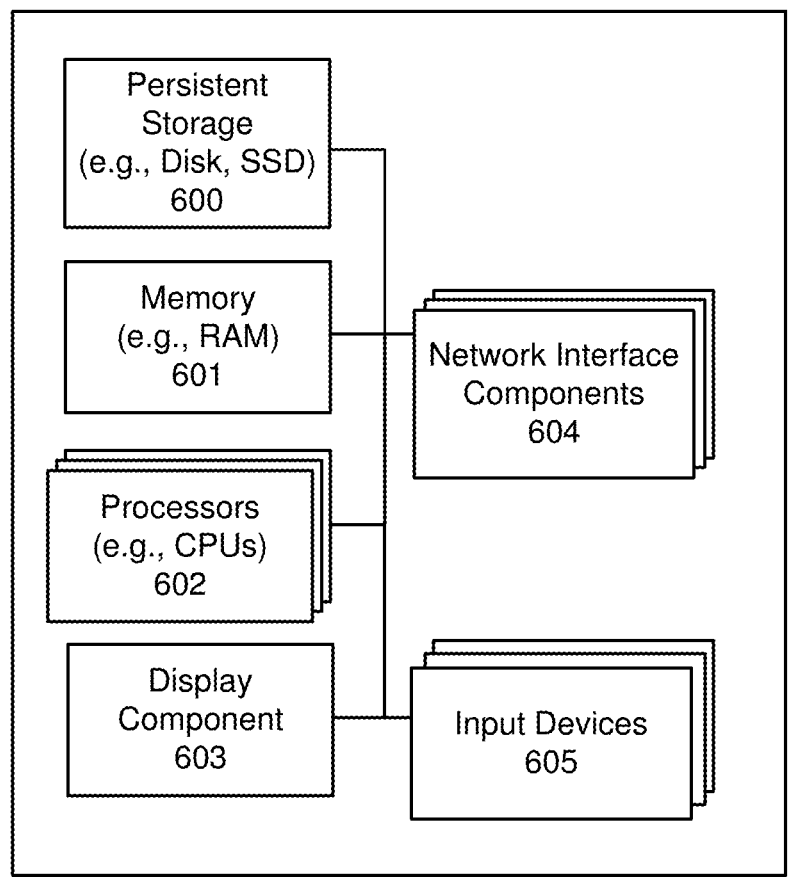
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as Wi-Fi, Bluetooth, RF, wired, or wireless communication systems. The device in many embodiments can communicate over a network, such as the Internet, and may be able to communicate with other devices connected to the same or other networks.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from those described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for clipboard redirection in a virtual desktop environment, comprising:
    establishing, over a network connection, a virtual desktop session between a virtual desktop client operating on a client computing device and a virtual desktop agent operating in a virtual desktop on a host server;
    in the virtual desktop, receiving a request to copy a file or folder to a virtual desktop clipboard;
    in response to the copy request, placing a path list comprising a file path for the file or folder in the virtual desktop clipboard;
    conveying the path list to the client device;
    receiving a request to paste the file or folder to a target location on the client device; and
    in response to the paste request, transferring the file or folder data from the virtual desktop by using the path list conveyed to the client device and saving the file or folder data in the target location.

2. The method of claim 1, wherein the path list is conveyed to the client device in response to detecting that the user ungrabbed the agent.

3. The method of claim 1, further comprising:
    setting the path list to the clipboard in the client device, such that a data request to the clipboard triggers a request of the file or folder data from the virtual desktop;

receiving a data request at the clipboard with the set path list;
in response to the data request, requesting the file or folder data from the virtual desktop; and
receiving the file or folder data from the virtual desktop.

4. The method of claim 3, further comprising:
suspending the data request while the file or folder data is transferred from the virtual desktop.

5. The method of claim 1, further comprising:
placing a data object in the client device clipboard, the data object being configured to request the file or folder data from the virtual desktop in response to the data object being accessed in the clipboard.

6. The method of claim 1, further comprising:
placing a temporary folder in the client device clipboard;
utilizing a file driver to detect accesses to the temporary folder in the client device clipboard;
detecting an access to the temporary folder in the client device clipboard and, in response to the access:
blocking the access; and
requesting the file or folder data from the virtual desktop.

7. The method of claim 1, further comprising:
in the client device, receiving a request to copy a second file or folder to a client device clipboard;
in response to the copy request, placing a second path list comprising a file path for the second file or folder in the client device clipboard;
conveying the second path list to the virtual desktop;
receiving a request to paste the second file or folder to a target location on the virtual desktop; and
in response to the paste request, transferring the second file or folder data from the client device and saving the file or folder data in the target location.

8. A computing device for clipboard redirection in a virtual desktop environment, comprising:
at least one processor; and
memory including instructions that, when executed by the at least one processor, cause the computing device to perform the steps of:
establishing, over a network connection, a virtual desktop session between a virtual desktop client operating on a client computing device and a virtual desktop agent operating in a virtual desktop on a host server;
in the virtual desktop, receiving a request to copy a file or folder to a virtual desktop clipboard;
in response to the copy request, placing a path list comprising a file path for the file or folder in the virtual desktop clipboard;
conveying the path list to the client device;
receiving a request to paste the file or folder to a target location on the client device; and
in response to the paste request, transferring the file or folder data from the virtual desktop by using the path list conveyed to the client device and saving the file or folder data in the target location.

9. The computing device of claim 8, wherein the path list is conveyed to the client device in response to detecting that the user ungrabbed the agent.

10. The computing device of claim 8, wherein the memory further includes instructions that when executed by the at least one processor, cause the computing device to perform the steps of:
setting the path list to the clipboard in the client device, such that a data request to the clipboard triggers a request of the file or folder data from the virtual desktop;
receiving a data request at the clipboard with the set path list;
in response to the data request, requesting the file or folder data from the virtual desktop; and
receiving the file or folder data from the virtual desktop.

11. The computing device of claim 10, wherein the memory further includes instructions that when executed by the at least one processor, cause the computing device to perform the steps of:
suspending the data request while the file or folder data is transferred from the virtual desktop.

12. The computing device of claim 8, wherein the memory further includes instructions that when executed by the at least one processor, cause the computing device to perform the steps of:
placing a data object in the client device clipboard, the data object being configured to request the file or folder data from the virtual desktop in response to the data object being accessed in the clipboard.

13. The computing device of claim 8, wherein the memory further includes instructions that when executed by the at least one processor, cause the computing device to perform the steps of:
placing a temporary folder in the client device clipboard;
utilizing a file driver to detect accesses to the temporary folder in the client device clipboard;
detecting an access to the temporary folder in the client device clipboard and, in response to the access:
blocking the access; and
requesting the file or folder data from the virtual desktop.

14. The computing device of claim 8, wherein the memory further includes instructions that when executed by the at least one processor, cause the computing device to perform the steps of:
in the client device, receiving a request to copy a second file or folder to a client device clipboard;
in response to the copy request, placing a second path list comprising a file path for the second file or folder in the client device clipboard;
conveying the second path list to the virtual desktop;
receiving a request to paste the second file or folder to a target location on the virtual desktop; and
in response to the paste request, transferring the second file or folder data from the client device and saving the file or folder data in the target location.

15. A non-transitory computer readable storage medium for clipboard redirection in a virtual desktop environment comprising one or more sequences of instructions, the instructions when executed by one or more processors causing the one or more processors to execute the operations of:
establishing, over a network connection, a virtual desktop session between a virtual desktop client operating on a client computing device and a virtual desktop agent operating in a virtual desktop on a host server;
in the virtual desktop, receiving a request to copy a file or folder to a virtual desktop clipboard;
in response to the copy request, placing a path list comprising a file path for the file or folder in the virtual desktop clipboard;
conveying the path list to the client device;

receiving a request to paste the file or folder to a target location on the client device; and in response to the paste request, transferring the file or folder data from the virtual desktop by using the path list conveyed to the client device and saving the file or folder data in the target location.

16. The non-transitory computer readable storage medium of claim 15, wherein the path list is conveyed to the client device in response to detecting that the user ungrabbed the agent.

17. The non-transitory computer readable storage medium of claim 15, further comprising instructions that when executed by the one or more processors cause the one or more processors to execute the operations of:

setting the path list to the clipboard in the client device, such that a data request to the clipboard triggers a request of the file or folder data from the virtual desktop;

receiving a data request at the clipboard with the set path list;

in response to the data request, requesting the file or folder data from the virtual desktop; and receiving the file or folder data from the virtual desktop.

18. The non-transitory computer readable storage medium of claim 17, further comprising instructions that when executed by the one or more processors cause the one or more processors to execute the operations of:

suspending the data request while the file or folder data is transferred from the virtual desktop.

19. The non-transitory computer readable storage medium of claim 15, further comprising instructions that when executed by the one or more processors cause the one or more processors to execute the operations of:

placing a data object in the client device clipboard, the data object being configured to request the file or folder data from the virtual desktop in response to the data object being accessed in the clipboard.

20. The non-transitory computer readable storage medium of claim 15, further comprising instructions that when executed by the one or more processors cause the one or more processors to execute the operations of:

placing a temporary folder in the client device clipboard;

utilizing a file driver to detect accesses to the temporary folder in the client device clipboard;

detecting an access to the temporary folder in the client device clipboard and, in response to the access:

blocking the access; and requesting the file or folder data from the virtual desktop.

* * * * *